United States Patent
Cullen et al.

[11] Patent Number: 5,832,722
[45] Date of Patent: Nov. 10, 1998

[54] METHOD AND APPARATUS FOR MAINTAINING CATALYST EFFICIENCY OF A $NO_x$ TRAP

[75] Inventors: Michael John Cullen, Northville; David George Farmer, Plymouth; Arnold William Brandt, Livonia; Jeffrey Scott Hepburn, Dearborn, all of Mich.

[73] Assignee: Ford Global Technologies, Inc., Dearborn, Mich.

[21] Appl. No.: 829,291

[22] Filed: Mar. 31, 1997

[51] Int. Cl.[6] .................................................. F01N 3/00
[52] U.S. Cl. ........................... 60/274; 60/285; 60/297
[58] Field of Search ........................... 60/274, 285, 297, 60/301

[56] References Cited

U.S. PATENT DOCUMENTS

| | | |
|---|---|---|
| 5,189,876 | 3/1993 | Hirota et al. . |
| 5,233,830 | 8/1993 | Takeshima et al. . |
| 5,402,641 | 4/1995 | Katoh et al. .................. 60/285 |
| 5,412,945 | 5/1995 | Katoh et al. .................. 60/285 |
| 5,423,181 | 6/1995 | Katoh et al. .................. 60/276 |
| 5,433,074 | 7/1995 | Seto et al. .................. 60/297 X |
| 5,437,153 | 8/1995 | Takeshima et al. ........... 60/276 |
| 5,448,887 | 9/1995 | Takeshima et al. . |
| 5,450,722 | 9/1995 | Takeshima et al. . |
| 5,467,594 | 11/1995 | Aoki et al. .................. 60/297 X |
| 5,472,673 | 12/1995 | Goto et al. .................. 60/297 X |
| 5,473,887 | 12/1995 | Takeshima et al. ........... 60/276 |
| 5,473,890 | 12/1995 | Takeshima et al. ........... 60/285 |
| 5,555,724 | 9/1996 | Hatcho et al. ............... 60/297 X |
| 5,715,679 | 2/1998 | Asanuma et al. ............. 60/297 X |
| 5,743,084 | 4/1998 | Hepburn ..................... 60/297 X |
| 5,746,049 | 5/1998 | Cullen et al. ............... 60/276 X |
| 5,758,493 | 6/1998 | Asik et al. ................. 60/274 |

FOREIGN PATENT DOCUMENTS

| | | |
|---|---|---|
| 3-124909 | 5/1991 | Japan . |
| 5-231136 | 9/1993 | Japan . |
| 5-231137 | 9/1993 | Japan . |
| 5-231138 | 9/1993 | Japan . |
| 5-312026 | 11/1993 | Japan . |
| 6-093845 | 4/1994 | Japan . |
| 6-330741 | 11/1994 | Japan . |
| 7-071234 | 3/1995 | Japan . |
| 7-293233 | 11/1995 | Japan . |
| 7-305644 | 11/1995 | Japan . |
| 7-310534 | 11/1995 | Japan . |
| 8-004522 | 1/1996 | Japan . |
| 8-061052 | 3/1996 | Japan . |
| 8-100639 | 4/1996 | Japan . |
| 8-105318 | 4/1996 | Japan . |
| 8-121147 | 5/1996 | Japan . |

*Primary Examiner*—John E. Ryznic
*Attorney, Agent, or Firm*—Allan J. Lippa; Roger L. May

[57] ABSTRACT

An engine control computer estimates the cumulative $SO_x$ stored in a $NO_x$ trap and enters a $SO_x$ purge mode of operation when a maximum storage capacity limit is exceeded. $SO_x$ accumulation is estimated based on fuel flow to the engine, A/F and trap temperature. The purge mode is terminated when the estimated $SO_x$ storage level drops below a minimum threshold level during the purging operation.

16 Claims, 4 Drawing Sheets

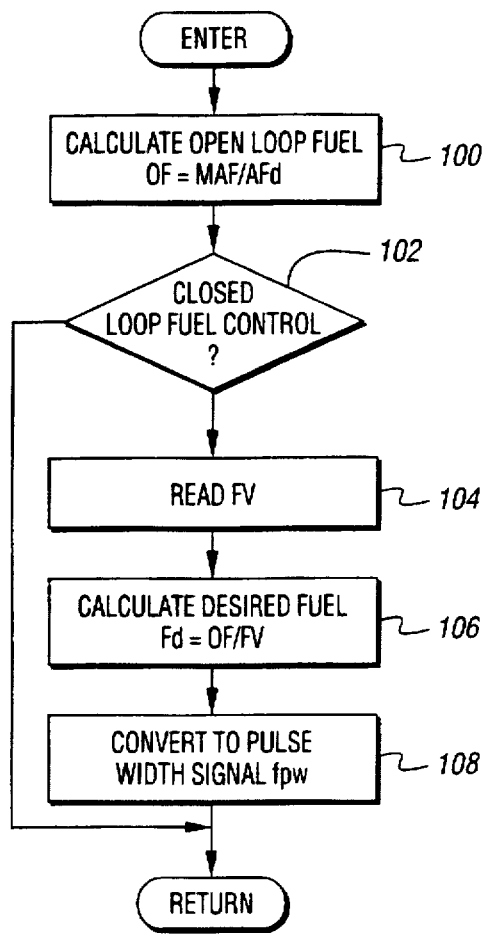
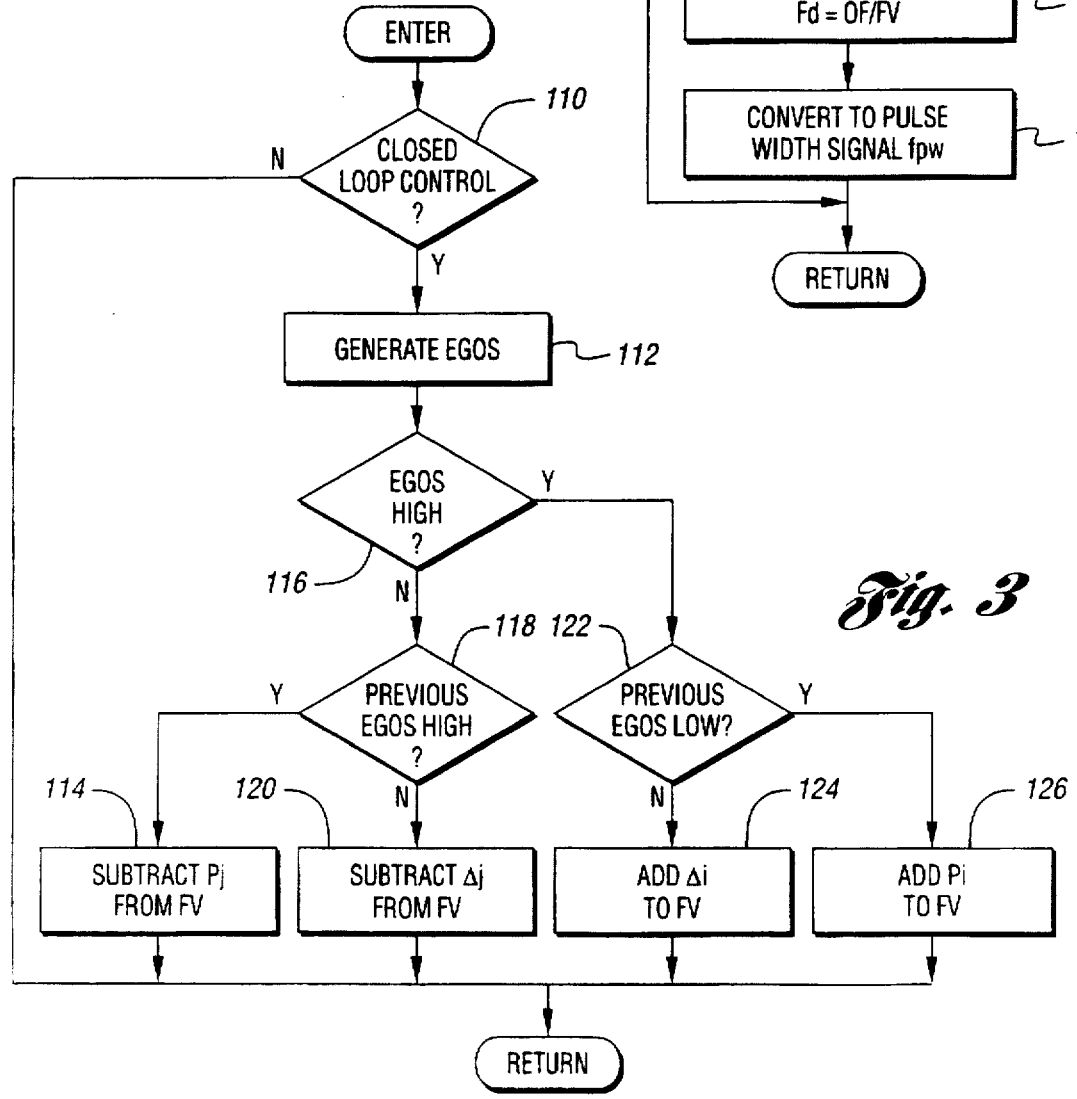
Fig. 2
Fig. 3

METHOD AND APPARATUS FOR MAINTAINING CATALYST EFFICIENCY OF A $NO_x$ TRAP

TECHNICAL FIELD

This invention relates to vehicle emissions control and, more particularly, to a method and apparatus for maintaining the efficiency of a $NO_x$ trap by estimating sulfur contamination and purging the trap of $SO_x$ when a predetermined $SO_x$ threshold is reached.

BACKGROUND ART

Conventional lean burn engine control systems include an air/fuel controller that delivers fuel to the engine proportional to measured air mass to maintain a desired air/fuel, lean of stoichiometric. The typical three-way catalytic converter provided in the engine exhaust passage does not convert the $NO_x$ produced while running lean. In order to reduce $NO_x$ emission to the atmosphere, it has been proposed to locate a $NO_x$ trap downstream of the three-way catalyst.

A typical $NO_x$ trap utilizes alkali metal or alkaline earth materials in combination with platinum in order to store or occlude $NO_x$ under lean operating conditions. The mechanisms for $NO_x$ storage involves the oxidation of NO to $NO2$ over the platinum followed by the subsequent formation of a nitrate complex with the alkaline metal or alkaline earth. Under stoichiometric operation or operation rich of stoichiometric, the nitrate complexes are thermodynamically unstable, and the stored $NO_x$ is released and catalytically reduced by the excess of CO, $H2$, and hydrocarbons (HCs) in the exhaust.

Accordingly, in the prior art the amount of $NO_x$ introduced to the trap since the last purge is estimated. When the trap is estimated to be full, the engine is switched to a relatively rich air/fuel to purge the $NO_x$ trap. After the trap is sufficiently purged, the engine is returned to lean operation. This $NO_x$ purging occurs within an optimum temperature window of approximately 300° C. to 400° C.

When operating with fuel containing sulfur, an accumulation of sulfur in the trap causes a decrease in $NO_x$ conversion efficiency. The sulfur must be "burned" off or desorbed at temperatures $\geq 675°$ C. and with an air-fuel ratio (A/F) $\leq 14.65$ (rich). One method of raising the temperature of the trap to a temperature of at least 675° C. is by introducing a source of secondary air into the exhaust upstream of the $NO_x$ trap and relying on the exothermic reaction to raise the trap temperature to the desired level to purge the trap of $SO_x$. See, for example, co-pending patent application Ser. No. 08/768,003, filed Dec. 13, 1996, assigned to the assignee of the present invention, and incorporated herein. In that application, the temperature of the trap is raised to a desired temperature for $SO_x$ purging by introduction and control of a secondary air source.

SUMMARY OF THE INVENTION

In accordance with the present invention, a method and apparatus is provided for determining when a $NO_x$ trap should be purged of $SO_x$. The method includes determining the amount of $SO_x$ accumulated per unit fuel flow, based on the present A/F and present temperature of the trap. The rate of $SO_x$ accumulation is then calculated based on the amount of $SO_x$ accumulated per unit fuel flow and the flow rate of fuel supplied to the engine. The amount of $SO_x$ accumulated is then calculated based on the rate of $SO_x$ accumulation and the elapsed time since the previous calculation.

BRIEF DESCRIPTION OF THE DRAWINGS

A more complete understanding of the present invention may be had from the following detailed description which should be read in conjunction with the drawings in which:

FIGS. 2 and 3 are high level flowcharts of conventional engine fuel control schemes;

DETAILED DESCRIPTION OF PREFERRED EMBODIMENT

Figure 1:
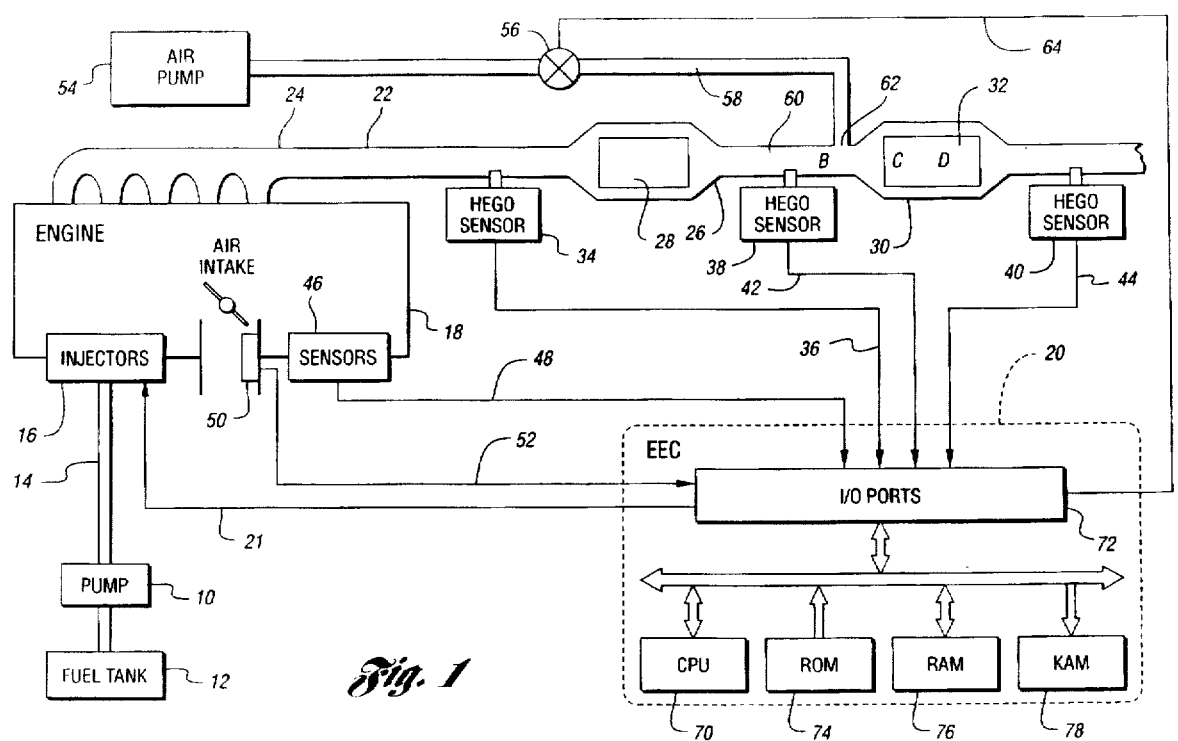
FIG. 1 is a block diagram of a vehicle engine and an electronic engine controller which embodies the principles of the invention.

Referring now to the drawings, and initially to FIG. 1, a fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The EEC 20 transmits a fuel injector signal to the injectors 16 via signal line 21 to maintain an air/fuel ratio determined by the EEC 20. The fuel tank 12 contains liquid fuels, such as gasoline, methanol or a combination of fuel types. An exhaust system 22, comprising one or more exhaust pipes and an exhaust flange 24, transports exhaust gas produced from combustion of an air/fuel mixture in the engine to a conventional three way catalytic converter 26. The converter 26, contains a catalyst material 28 that chemically alters exhaust gas that is produced by the engine to generate a catalyzed exhaust gas.

The catalyzed exhaust gas is fed to a downstream $NO_x$ trap 32 composed of material of the type previously described. The trap 32 is contained in a housing generally indicated at 30. A heated exhaust gas oxygen (HEGO) sensor 34 detects the oxygen content of the exhaust gas generated by the engine 18, and transmits a signal over conductor 36 to the EEC 20. A pair of HEGO sensor 38 and 40 are located upstream and downstream, respectively, of the trap 32, and provide signals to the EEC 20 over conductors 42 and 44, respectively. Still other sensors, indicated generally at 46, provide additional information about engine performance to the EEC 20, such as crankshaft position, angular velocity, throttle position, air temperature, etc. The information from these sensors is used by the EEC 20 to control engine operation.

A mass air flow sensor 50 positioned at the air intake of engine 18 detects the amount of air inducted into an induction system of the engine and supplies an air flow signal over conductor 52 to the EEC 20. The air flow signal is utilized by EEC 20 to calculate an air mass (AM) value which is indicative of a mass of air flowing into the induction system in lbs./min.

An air pump 54, which may be electrically powered or mechanically coupled to the engine 18, provides a pressurized source of air from the atmosphere, for injecting air through an air passage 58 into an exhaust passage portion 60 at a pierce point 62 downstream of the catalytic converter 26 and generally at the entrance of the $NO_x$ trap 32. The amount of air injected depends on the positioning of a control valve 56 under the control of EEC 20 over conductor 64. The control valve 56 may be an ON/OFF valve which opens and closes in accordance with a control signal or may be a flow control valve which can adjust flow rate continuously.

The EEC 20 comprises a microcomputer including a central processor unit (CPU) 70, input and output (I/O) ports 72, read only memory (ROM) 74 for storing control programs, random access memory (RAM) 76, for temporary data storage which may also be used for counters or timers, and keep-alive memory (KAM) 78 for storing learned values. Data is communicated over a conventional data bus as shown. The EEC 20 also includes an engine off timer that provides a record of the elapsed time since the engine was last turned off as a variable "soaktime".

The liquid fuel delivery routine executed by controller 20 for controlling engine 18 is shown in the flowchart of FIG. 2. An open loop calculation of desired liquid fuel is calculated at block 100. More specifically, the measurement of inducted mass air flow (MAF) from sensor 50 is divided by a desired air/fuel ratio (AFd), which in this example is correlated with stoichiometric combustion. At decision block 102, a determination is made whether closed loop feedback control is desired by monitoring engine operating parameters such as engine coolant temperature. Fuel command or desired fuel signal Fd is generated by dividing feedback variable FV, read at block 104, into the previously generated open loop calculation of desired fuel in block 106. Desired fuel signal Fd is then converted to a pulse width signal fpw at block 108 for actuating fuel injectors 16, thereby delivering fuel to engine 18 in relation to the magnitude of the desired fuel signal Fd.

The air/fuel feedback routine executed by controller 20 to generate fuel feedback variable FV is shown in the flowchart in FIG. 3. Under closed loop control as determined at block 110, a two-state signal EGOS is generated at block 112 from the signal provided by the sensor 34. Predetermined proportional term Pj is subtracted from feedback variable FV at block 114 when the signal EGOS is low, but was high during the previous background loop of controller 20 as determined at decision blocks 116 and 118. When signal EGOS is low and was also low during the previous background loop, predetermined integral term Aj is subtracted from feedback variable FV at block 120.

On the other hand, when signal EGOS is high and was also high during the previous background loop of controller 20, as determined at decision blocks 116 and 122, integral term Ai is added to feedback variable FV at block 124. When signal EGOS is high but was low during the previous background loop, proportional term Pi is added to feedback variable FV at block 126.

If operating in a lean mode, it will be understood that closed loop air/fuel control is disabled and feedback variable FV is generated in an open loop manner to provide lean air/fuel engine operation. More specifically, feedback variable FV is generated by reading a look-up table value as a function of engine speed and load and multiplying the table value by a multiplier LMULT. The resulting product is then added to unity which is the stoichiometric air/fuel reference. Multiplier LMULT, which varies between 0 and unity, is gradually incremented to ramp engine air/fuel operation to a desired lean air/fuel ratio. Feedback variable FV is thereby generated which is an indication of desired air/fuel.

Figure 4A:
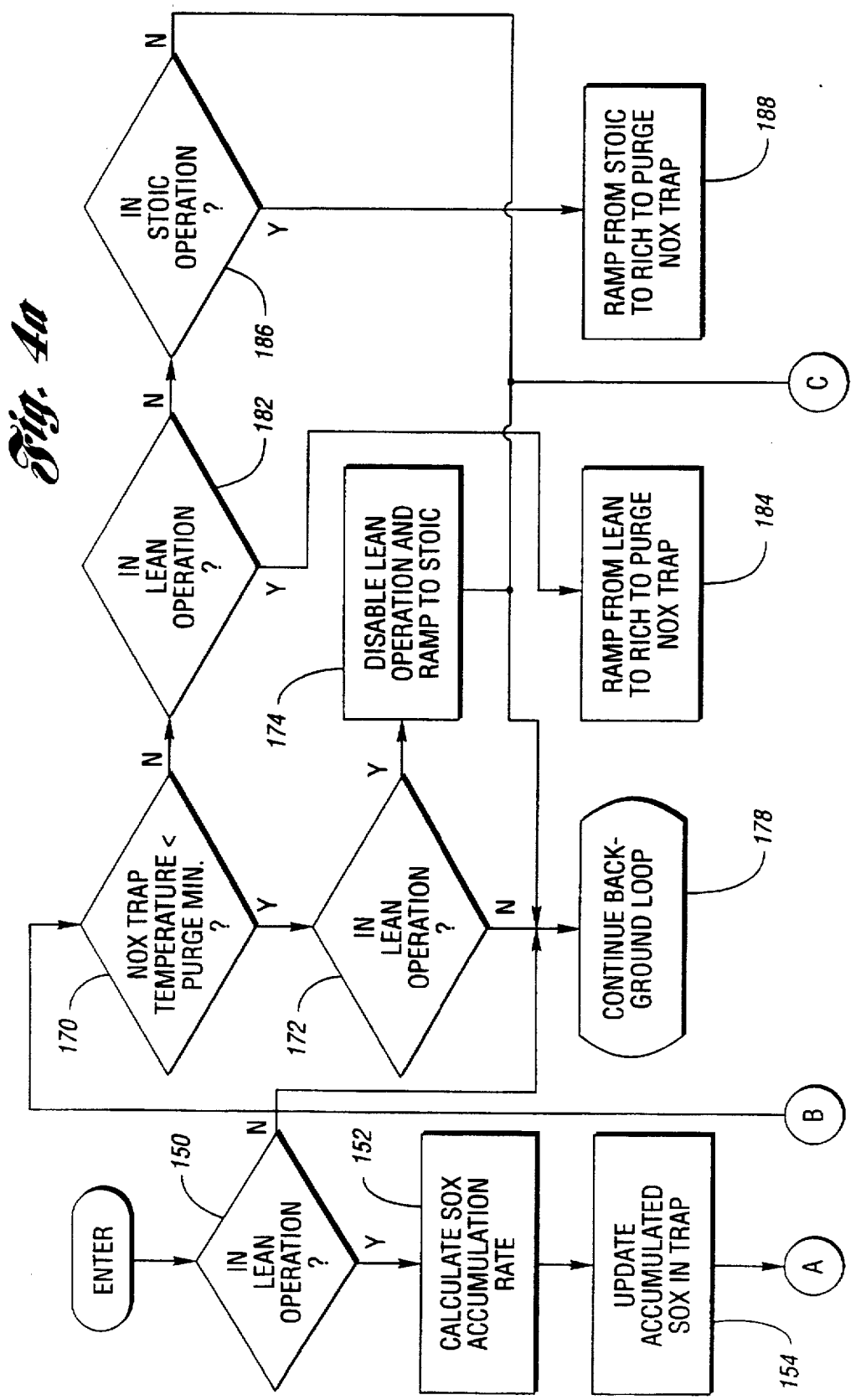
FIGS. 4a and 4b are flowcharts of a method of estimating the accumulation of $SO_x$ in a $NO_x$ trap and estimating the removal of $SO_x$ during a purging operation.
Figure 4B:
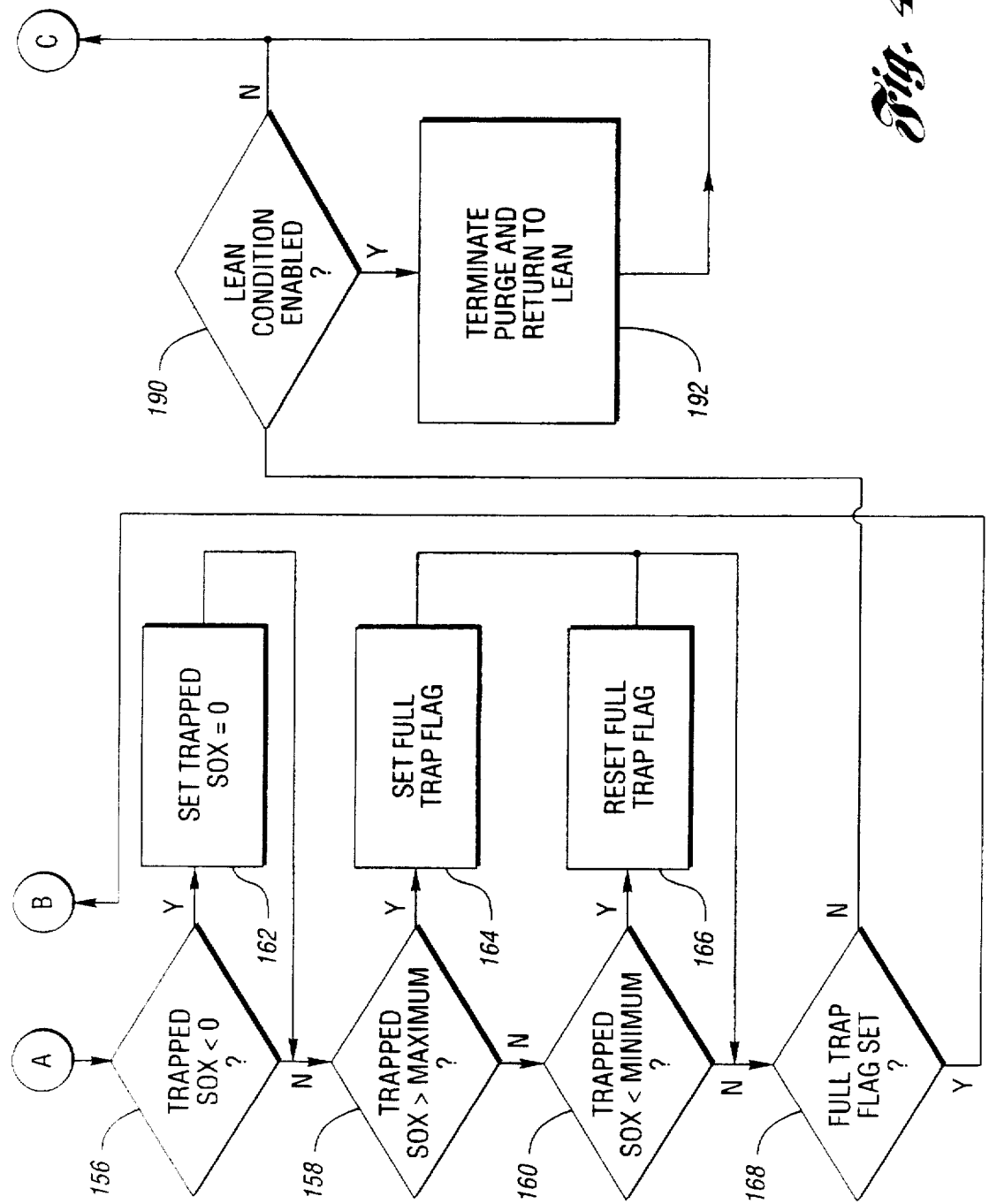

Referring now to FIGS. 4a and 4b, a flowchart of the method of controlling $SO_x$ purging of the $NO_x$ trap is shown. At block 150 a determination is made whether the engine is operating in a lean mode. If not, the background loop is continued. If operating lean, the present $SO_x$ accumulation rate is calculated in block 152. The accumulation rate, in grams/hr, generated since the last time through this loop, is preferably expressed by the following relationship.

$$SO_x\_FLOW\_RATE = FNXXA(LAMBSE, EXT\_NTR)*FUELFLOW$$

where:

$SO_x\_FLOW\_RATE$ is the resultant accumulation rate in grams/hr.

FNXXA (LAMBSE, EXT_NTR) is a look-up table of the rate of $SO_x$ accumulation (grams of $SO_x$/lb of fuel). This table is negative when hot and rich and positive when lean as indicated below where:

LAMBSE is the desired A/F expressed as an equivalence ratio; and

EXT_NTR is the estimated $NO_x$ trap temperature.

| EXT_NTR DEG. C | LAMBSE =.8 | LAMBSE =.9 | LAMBSE =1. | LAMBSE =1.1 | LAMBSE =2.5 |
|---|---|---|---|---|---|
| 500 | −.1 | −.05 | −.001 | .001 | .001 |
| 600 | −1. | −.5 | −.01 | .001 | .001 |
| 700 | −10. | −5. | −.1 | .001 | .001 |
| 800 | −1000. | −500. | −10. | .001 | .001 |

FUELFLOW is the measured fuel flow rate in lbs/hr.

At block 154, the cumulative amount of $NO_x$ stored in the trap is updated by adding the amount of $NO_x$ stored during this background loop to the amount previously stored and may be expressed as:

$$TRAP\_SO_x\_GRAMS\ (Present) = TRAP\_SO_x\_GRAMS\ (Previous) + (SO_x\_FLOW\_PRATE*BG\_TMR/3600)$$

where

BG_TMR is the background loop time in seconds.

TRAP_$SO_x$_GRAMS(Present) is the accumulated $SO_x$ in the trap. This amount is stored in keep-alive memory 78.

After updating the amount of stored $SO_x$, the amount is first checked at block 156 to see if the amount is a negative number. If not, at block 158 the amount is checked to determined if it exceeds a maximum trap capacity. If not, at block 160 the amount is checked to determined if it is less than a trap capacity that would indicate purging has progressed sufficiently to return to lean operation.

If at block 156 the amount if negative, the amount is set to zero at block 162. If the amount exceeds the maximum trap capacity, as determined in block 158, a $SO_x\_FULL\_FLAG$ is set in block 164. If the amount is less than the minimum amount to return to lean operation, as determined in block 160, the $SO_x\_FULL\_FLAG$ is reset at block 166.

The function performed in block 158 may be expressed as:

$$TRAP\_SO_x\_GRAMS > SO_x\_MAX\_GRAMS$$

where:

$SO_x\_MAX\_GRAMS$ is the threshold level of stored $SO_x$, above which the lean operation should be terminated and a $SO_x$ purge operation should begin.

The function performed in block 160 may be expressed as:

$$TRAP\_SO_x\_GRAMS < SO_x\_MIN\_GRAMS$$

where:

$SO_x\_MIN\_GRAMS$ is the thershold level of stored grams of $SO_x$, below which a lean operation can be resumed.

At block 168, the $SO_x\_FULL\_FLAG$ is checked. If the flag is set and the $NO_x$ trap temperature is less than the temperature needed to enter the $SO_x$ purge mode, as determined in block 170, and the engine is being operated in the lean mode as determined by block 172, the A/F is ramped from lean to stoichiometric, as indicated at block 174 and background loop is continued at block 178. If at block, it is determined that the trap temperature is greater than the minimum purge temperature, whether as a result of secondary air addition or other operating conditions, and if the engine is being operated in the mode as determined by block 182, the A/F is ramped from lean to rich, as indicated at block 184, to begin purging the trap 32 of $SO_x$. If the engine is operating at stoichiometric rather than lean as determined by the blocks 182 and 186, then the A/F is ramped from stoichiometric to rich to begin purging the trap as indicated at block 188. The previously mentioned patent application Ser. No. 08/768,003 discloses a method of inferring $NO_x$ trap temperature and controlling the pump 54 to maintain a desired purging temperature.

If on the other hand, the flag $SO_x$_FULL_FLAG, is in a reset state, because the amount of $SO_x$ is between the minimum and maximum threshold levels or the trap has been purged below the minimum threshold, as determined at block 168, and lean conditions are enabled, as determined by block 190, the purge operation is terminated and the A/F is ramped to return to lean operation. If lean operation conditions are not present, the background loop is continued as indicated at 178.

While the best mode for carrying out the present invention has been described in detail, those familiar with the art to which this invention relates will recognize various alternative designs and embodiments for practicing the invention as defined by the following claims.

What is claimed is:

1. A method of estimating the amount of $SO_x$ accumulated in a $NO_x$ trap located in an exhaust passage of an engine comprising a sequence of the steps of:

determining an amount of $SO_x$ accumulated per unit fuel flow, based on present A/F and present temperature of said trap;

calculating the rate of $SO_x$ accumulation based on said determined amount of $SO_x$ and the flow rate of fuel supplied to said engine; and calculating the amount of $SO_x$ accumulation based on said calculated rate of $SO_x$ accumulation and the elapsed time since a previous calculation.

2. The method defined in claim 1 further comprising the step of:

adding the amount of $SO_x$ stored since said previous calculation to the calculated amount previously stored to obtain a cumulative amount.

3. The method defined in claim 2 further comprising the steps of:

comparing the cumulative amount of $SO_x$ stored with a maximum capacity level; and initiating a $SO_x$ purge operation when said maximum capacity level is exceeded in order to reduce the amount of $SO_x$ stored in said trap.

4. The method defined in claim 3 wherein said purge operation comprises the steps of:

controlling the temperature of said trap above a predetermined minimum purging temperature; and operating said engine at a rich A/F.

5. The method defined in claim 4 comprising the further steps of:

terminating said purge operation when the amount of $SO_x$ stored in said trap is less than a minimum capacity level.

6. The method defined in claim 2 wherein said determined amount is positive when said engine is operating lean and negative when said engine is operating rich.

7. Apparatus for estimating the amount of $SO_x$ accumulated in a $NO_x$ trap located in an exhaust passage of an engine comprising:

a read only memory containing experimentally determined data representing the expected amount of $SO_x$ that would be accumulated in said trap per quantity of fuel supplied to said engine at a specified A/F and trap temperature;

an engine controller for estimating the temperature of said trap, and for calculating the desired fuel quantity to achieve a desired A/F;

said controller calculating the incremental amount of $SO_x$ accumulated in said trap since the previous calculation based on the product of the read only memory data, corresponding to the present A/F and trap temperature, and the amount of fuel supplied to said engine since the previous calculation.

8. The apparatus of claim 7 wherein said controller adds said incremental amount to a previously calculated total amount of accumulated $SO_x$ to obtain a cumulative amount of stored $SO_x$.

9. The apparatus of claim 8 wherein said controller compares said cumulative amount of stored $SO_x$ with a maximum capacity level and initiating a $SO_x$ purge operation when said maximum capacity level is exceeded.

10. The apparatus defined in claim 9 wherein said controller operates said engine at a rich A/F and controls the amount of secondary air added to said exhaust, upstream of said trap, to maintain the temperature of said trap above a predetermined minimum purging temperature during said purge operation.

11. The apparatus defined in claim 10 wherein said controller terminates said purge operation when the amount of $SO_x$ stored in said trap is less than a minimum capacity level.

12. The apparatus defined in claim 8 wherein said read only memory contains data that is positive when said engine is operating lean and negative when said engine is operating rich.

13. An article of manufacture comprising:

a computer storage medium having a computer program encoded therein for controlling the amount of fuel supplied to an engine having an exhaust passage with a $NO_x$ trap located therein, said computer storage medium comprising:

code for determining the temperature of said trap;

code for calculating the amount of fuel to be delivered to said engine to achieve a desired A/F; and code for calculating the incremental amount of $SO_x$ accumulated in said trap at said A/F and trap temperature.

14. The article defined in claim 13 wherein said medium further comprises:

code for adding said incremental amount to a previously calculated total amount of accumulated $SO_x$.

15. The article defined in claim 14 wherein said medium further comprises:

code for comparing said total amount of accumulated $SO_x$ with a maximum capacity level and initiating a $SO_x$ purge operation when said maximum capacity level is exceeded.

16. The article defined in claim 15 wherein the incremental amount of $SO_x$ accumulated in said trap is a function of the amount of fuel supplied to said engine since the previous calculation.

* * * * *